United States Patent [19]

Watanabe

[11] Patent Number: 5,297,022
[45] Date of Patent: Mar. 22, 1994

[54] CAD/CAM UNIT DATA GENERATING APPARATUS AND PROCESS

[75] Inventor: Kotaro Watanabe, Aichi, Japan

[73] Assignee: Mitsubishi Denki Kabushiki Kaisha, Tokyo, Japan

[21] Appl. No.: 826,073

[22] Filed: Jan. 27, 1992

[30] Foreign Application Priority Data

Feb. 21, 1991 [JP] Japan .................................. 3-027234

[51] Int. Cl.$^5$ ...................... G06F 15/46; G05B 19/403
[52] U.S. Cl. ................................. 364/191; 364/474.24
[58] Field of Search ..................... 364/191, 192, 474.24

[56] References Cited

U.S. PATENT DOCUMENTS

| | | | |
|---|---|---|---|
| 4,546,434 | 10/1985 | Gioello | 364/192 |
| 4,907,164 | 3/1990 | Guyder | 364/474.24 |
| 4,912,625 | 3/1990 | Glatfelter | 364/192 |
| 4,928,221 | 5/1990 | Belkhiter | 364/191 |
| 5,019,961 | 5/1991 | Addesso et al. | 364/192 |
| 5,115,400 | 5/1992 | Watanabe et al. | 364/474.24 |

FOREIGN PATENT DOCUMENTS 2-293903 12/1990 Japan .
4-5708 1/1992 Japan .

Primary Examiner—Jerry Smith
Assistant Examiner—Paul Gordon
Attorney, Agent, or Firm—Sughrue, Mion, Zinn, Macpeak & Seas

[57] ABSTRACT

A CAD/CAM unit data generating process which allows machining control data to be generated efficiently, and independently of the sequence of shape definition. Machining sequence information is derived from shape defining information and machining information generated in correspondence with machining conditions. The machining sequence information is rearranged in accordance with selected conditions for rearranging the machining sequence information, such as machining type, height priority, tool sequence, and other operator inputs. The results are stored for future access.

13 Claims, 10 Drawing Sheets

FIG. 5

| SHAPE NAME | MACHINING TYPE | ZONE/HOLE | ROUGH/FINISH | Z HEIGHT | T NUMBER | TOOL NAME |
|---|---|---|---|---|---|---|
| ZONE 0000 | SHIFT | ZONE | ROUGH | 0 | 11 | SSV1002 |
| ZONE 0000 | CONTOUR | ZONE | INTERMEDIATE | 0 | 10 | SSV0502 |
| ZONE 0000 | CONTOUR | ZONE | FINISH | 0 | 9 | SSV0304 |
| ZONE 0001 | SHIFT | ZONE | ROUGH | -10 | 11 | SSV1002 |
| ZONE 0001 | CONTOUR | ZONE | INTERMEDIATE | -10 | 10 | SSV0502 |
| ZONE 0001 | CONTOUR | ZONE | FINISH | -10 | 9 | SSV0304 |
| ZONE 0002 | SHIFT | ZONE | ROUGH | -15 | 11 | SSV1002 |
| ZONE 0002 | CONTOUR | ZONE | INTERMEDIATE | -15 | 10 | SSV0502 |
| ZONE 0002 | CONTOUR | ZONE | FINISH | -15 | 9 | SSV0304 |
| HOLE 0000 | CENTER | HOLE | CENTER | 0 | 7 | CSW025 |
| HOLE 0000 | DRILL | HOLE | DRILL | 0 | 7 | DSV099 |
| HOLE 0000 | SPOT FACE | HOLE | SPOT FACE | 0 | 9 | SSV0304 |

FIG. 6

| ZONE/HOLE DEVELOPMENT | HOLE PRIORITY |
|---|---|
| ROUGHING/FINISHING DEVELOPMENT | ON |
| Z HEIGHT DEVELOPMENT | ON |
| TOOL RISING SEQUENCE DEVELOPMENT | ON |

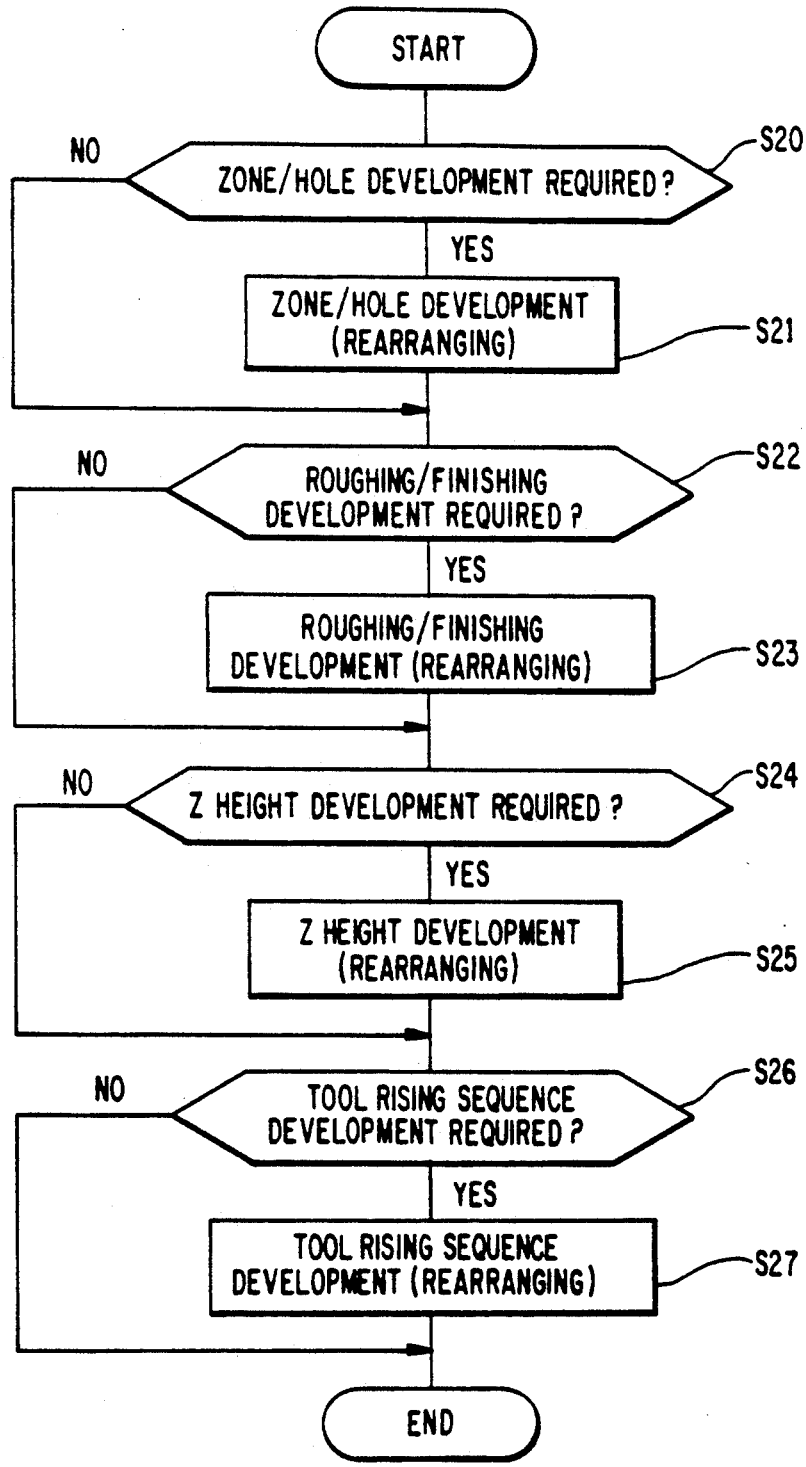

FIG. 8

| SHAPE NAME | MACHINING TYPE | ZONE/HOLE | ROUGH/FINISH | Z HEIGHT | T NUMBER | TOOL NAME |
|---|---|---|---|---|---|---|
| HOLE 0000 | CENTER | HOLE | CENTER | 0 | 7 | CSW025 |
| HOLE 0000 | DRILL | HOLE | DRILL | 0 | 7 | DSV099 |
| HOLE 0000 | SPOT FACE | HOLE | SPOT FACE | 0 | 9 | SSV0304 |
| ZONE 0000 | SHIFT | ZONE | ROUGH | 0 | 11 | SSV1002 |
| ZONE 0001 | SHIFT | ZONE | ROUGH | -10 | 11 | SSV1002 |
| ZONE 0002 | SHIFT | ZONE | ROUGH | -15 | 11 | SSV1002 |
| ZONE 0000 | CONTOUR | ZONE | INTERMEDIATE | 0 | 10 | SSV0502 |
| ZONE 0001 | CONTOUR | ZONE | INTERMEDIATE | -10 | 10 | SSV0502 |
| ZONE 0002 | CONTOUR | ZONE | INTERMEDIATE | -15 | 10 | SSV0502 |
| ZONE 0000 | CONTOUR | ZONE | FINISH | 0 | 9 | SSV0304 |
| ZONE 0001 | CONTOUR | ZONE | FINISH | -10 | 9 | SSV0304 |
| ZONE 0002 | CONTOUR | ZONE | FINISH | -15 | 9 | SSV0304 |

CAD/CAM UNIT DATA GENERATING APPARATUS AND PROCESS

BACKGROUND OF THE INVENTION

1. Field of the Invention

The present invention relates to a CAD/CAM unit data generating process which allows data for efficient machining to be generated independently of a shape defining sequence.

2. Description of the Background

FIG. 9 is a block diagram illustrating the configuration of a CAD/CAM unit known in the art. The unit has an input device 1, comprising one or more of a keyboard 2, a mouse 3 and a tablet 4, that is employed for entering shape information (e.g., round, square, height etc.), character information, etc. A shape defining section 5 is used for converting the entered shape information into data corresponding to an internal storage format. A machining defining section 6 is where machining information, used for starting and finishing a shape in correspondence with the entered shape information, is generated in response to character information from input device 1. A shape information memory 7 is used for storing the output of the shape defining section. A machining information memory 8 is used for storing the output of the machining defining section 6. A process analyzer 11 sequentially analyzes the shape information and machining information output by the shape information memory 7 and machining information memory 8, respectively. The analyzer 11 then determines how the workpiece is to be machined. A NC information generator 12 decides upon an appropriate machining path in accordance with the information analyzed by the process analyzer 11 and generates NC control data. A NC data file 13 is used for storing the NC data generated by the NC information generator 12. A machining path display 14, that performs display processing of the NC data, is also operative to control the display on a CRT 15 of the machining path.

Operation of the conventional CAD/CAM unit will now be described. First, an operator controls the keyboard 2, mouse 3 and tablet 4 of the input device 1 to enter shape information (geometric information such as coordinate values, depths, heights, etc). The input shape information is converted into data corresponding to an internal storage format by the shape defining section 5, then stored in the shape information memory 7. At this time, the shape information is arranged on the basis of one or more machining units. Where plural units are required for a single shape, they are stored in a shape defining sequence.

Information concerning the machining conditions (information such as tool names and feed rates) for each machining unit for a shape, as described previously, also is entered from the input device 1 by the operator. The entered machining information is converted into data corresponding to the internal storage format by the machining defining section 6, then stored in the machining information memory 8 on a machining unit basis and in a shape defining sequence.

The information is stored in the shape information memory 7 and machining information memory 8 in the manner shown in FIG. 10. That Figure illustrates the organization and sequence for storing shape information and machining information so that NC information corresponding to the three-step pocket machining, illustrated in FIG. 11, can be effectively generated. Specifically, the shape information has been entered by the operator in order of shape a, shape b and shape c, and the machining information also has been input in the order a, b, c. The machining information is arranged to have a direct correspondence to its respective shape. As seen in the Figure, it is linked to the shape information and is arranged in a list structure in the same order. In this manner, geometric information such as the coordinate values, depths, etc. of each shape is stored in the shape information memory 7, and tool names, feedrates, etc. employed for the machining of each shape are correspondingly stored in the machining information memory 8.

The information in the shape information memory 7 and machining information memory 8 is then analyzed by the process analyzer 11, sequentially. At this time, retrieval is made in accordance with the list structure and therefore the information is analyzed in order of shape a, shape b and shape c. The analysis identifies relative heights, sizes and geometries of the several shapes and may prioritize or weight the several shapes.

A machining path is then determined by the NC information generator 12 in accordance with the analysis results of the process analyzer 11. The selected machining path is written to the NC data file 13 in the sequence from shape a to shape c. The data defining the selected machining path may be processed by the machining path display 14 for display of the selected machining path on the CRT 15.

In the conventional CAD/CAM unit data generating process carried out as described above, the machining sequence is set according to the shape defining sequence. However, in practice, shapes alone cannot determine the machining sequence, particularly where the shapes are complex. To carry out efficient machining, shapes often are defined after the machining sequence has been examined in detail. Because of this interrelationship between the shape and machining sequence, a significant amount of time is required for the generation of NC data, thus resulting in an inefficient operation. Moreover, when the shapes are complex, or closely similar in size or contour, errors can occur such that the proper order of machining is not followed, e.g., the highest point in a workpiece is not machined last.

It is, accordingly, an object of the present invention to overcome the disadvantages in the conventional unit by providing a CAD/CAM unit data generating process which allows data to be generated efficiently, independently of the sequence of shape definition.

SUMMARY OF THE INVENTION

A CAD/CAM unit data generating process concerned with the present invention comprises a first step of extracting predetermined information from (i) shape information generated in correspondence with shapes defined on a machining unit basis and (ii) machining information generated in correspondence with machining conditions defined on a shape information basis and organizing the extracted information as machining sequence information in a predefined sequence. In a second step, the conditions for rearranging the machining sequence information are set. The next step involves rearranging the machining sequence information in accordance with the set conditions. In the final step, the rearranged machining sequence information is stored.

3

BRIEF DESCRIPTION OF THE DRAWINGS

FIG. 5 shows machining sequence information generated in order of definition according to an embodiment of the present invention.

FIG. 6 shows process development conditions according to an embodiment of the present invention.

FIG. 7 is a flowchart illustrating a method of rearranging the machining sequence information according to an embodiment of the present invention.

FIG. 8 shows machining sequence information rearranged in accordance with the process development conditions according to an embodiment of the present invention.

DESCRIPTION OF THE PREFERRED EMBODIMENTS

Figure 1:
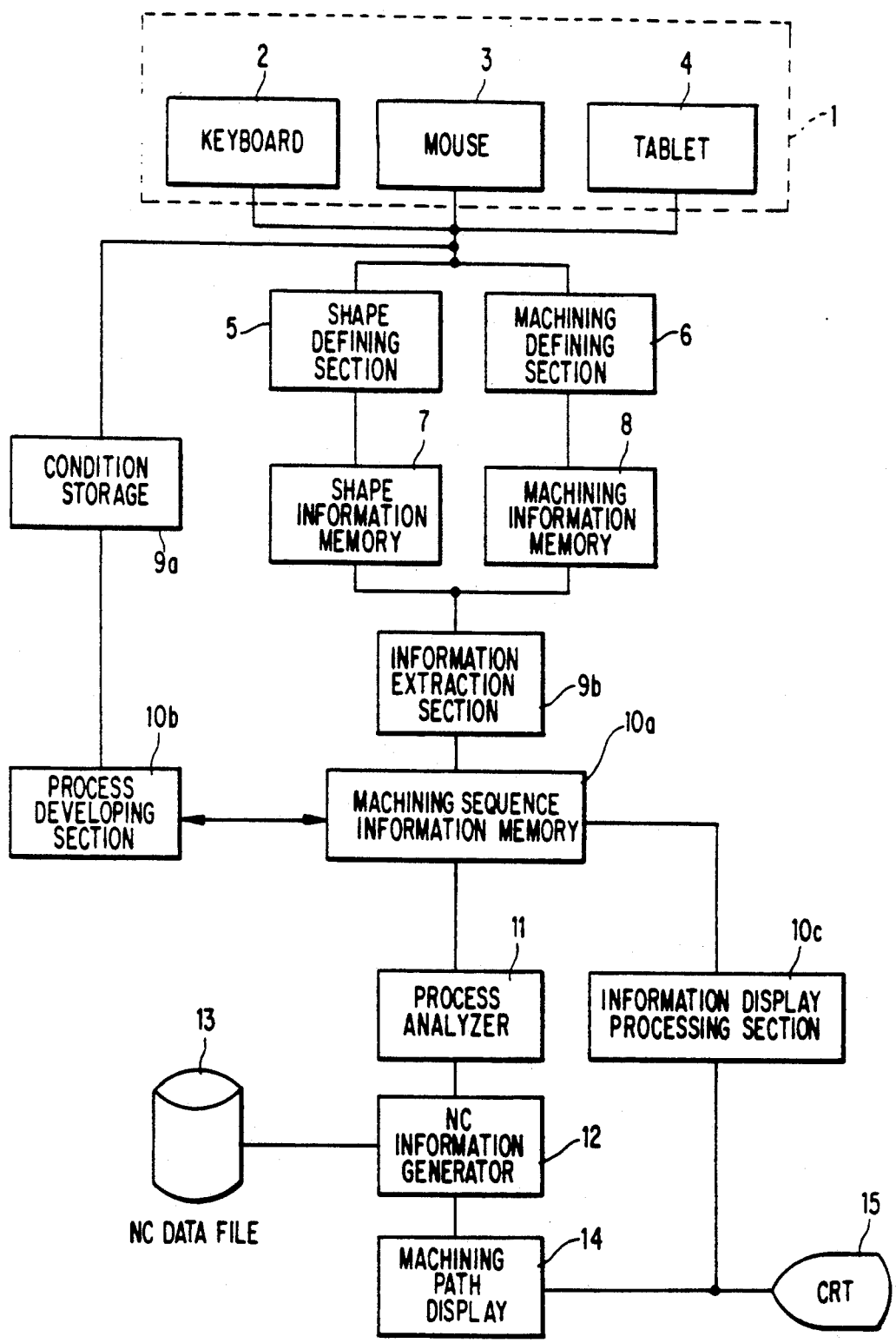
FIG. 1 is a block diagram illustrating the configuration of a CAD/CAM unit according to an embodiment of the present invention.
Figure 9:
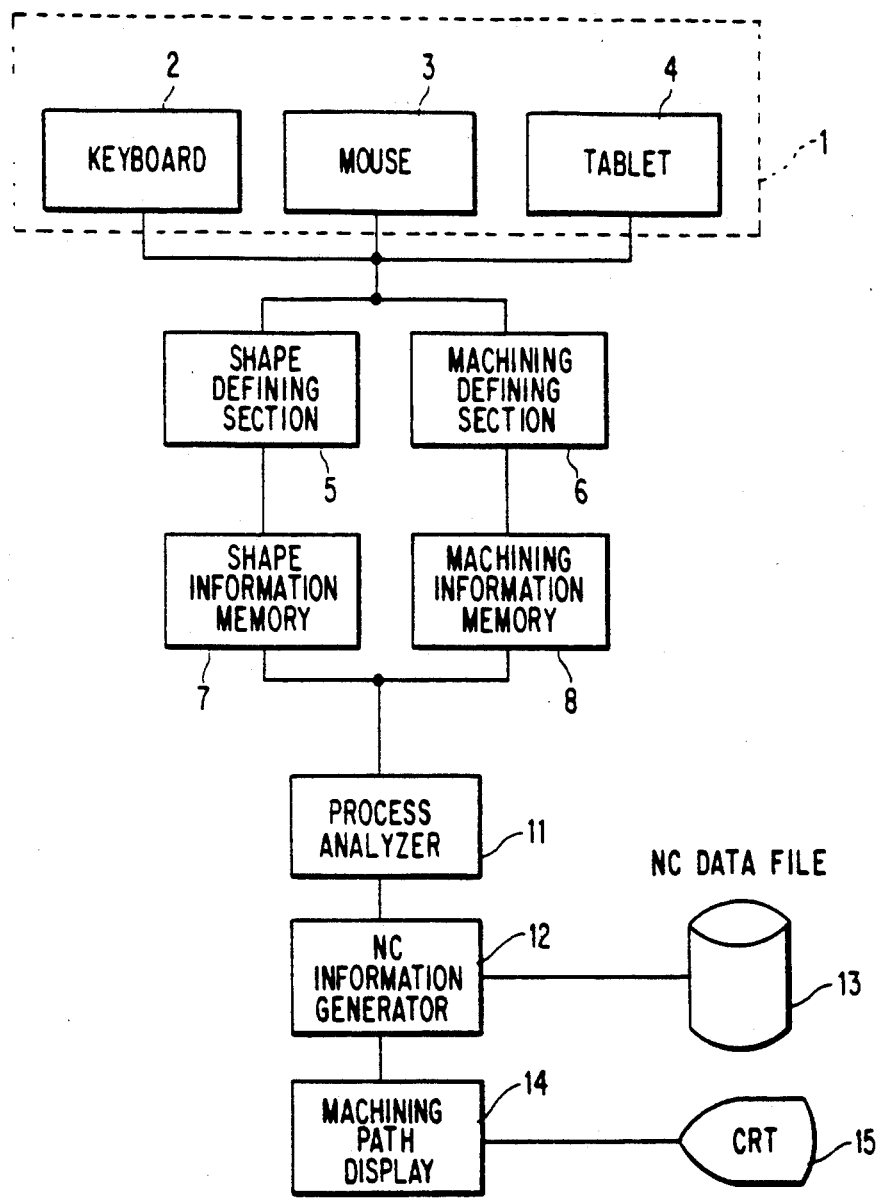
FIG. 9 is a block diagram illustrating the configuration of a CAD/CAM unit known in the art.
Figure 10:
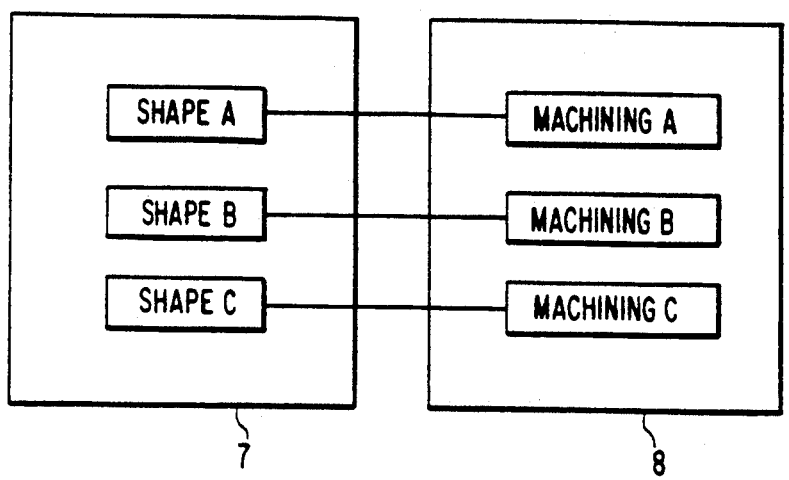
FIG. 10 illustrates information stored in the conventional shape information memory and machining information memory.
Figure 11A:
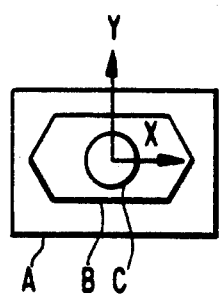
FIGS. 11A and 11B show a machined shape.
Figure 11B:
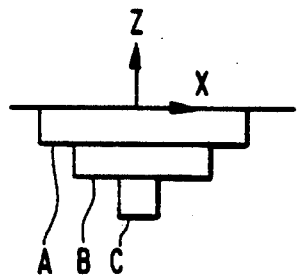

An embodiment of the present invention will now be described in reference to the drawings. In FIG. 1, a condition storage 9a is used for storing the conditions for rearranging in any desired order the information stored in the shape information memory 7 and machining information memory 8. The conditions may be entered by an operator through the input device 1. A process developing section 10b is used for rearranging in a desired order the information stored in the shape information memory 7 and machining information memory 8 in accordance with the conditions stored in the condition storage 9a. The information in shape information memory 7 and machining information memory 8 is extracted and stored in a machining sequence information memory for access and rearrangement by process developing section 10b. The machining sequence information memory 10a also is used for storing the information rearranged by the process developing section 10b. The rearranged information is accessed by the process analyzer 11, and the information display processing section 10c. The reference characters in FIG. 10, which are identical to those in FIG. 9 illustrating the conventional apparatus, indicate like or corresponding parts and therefore will not be described herein.

Figure 2:
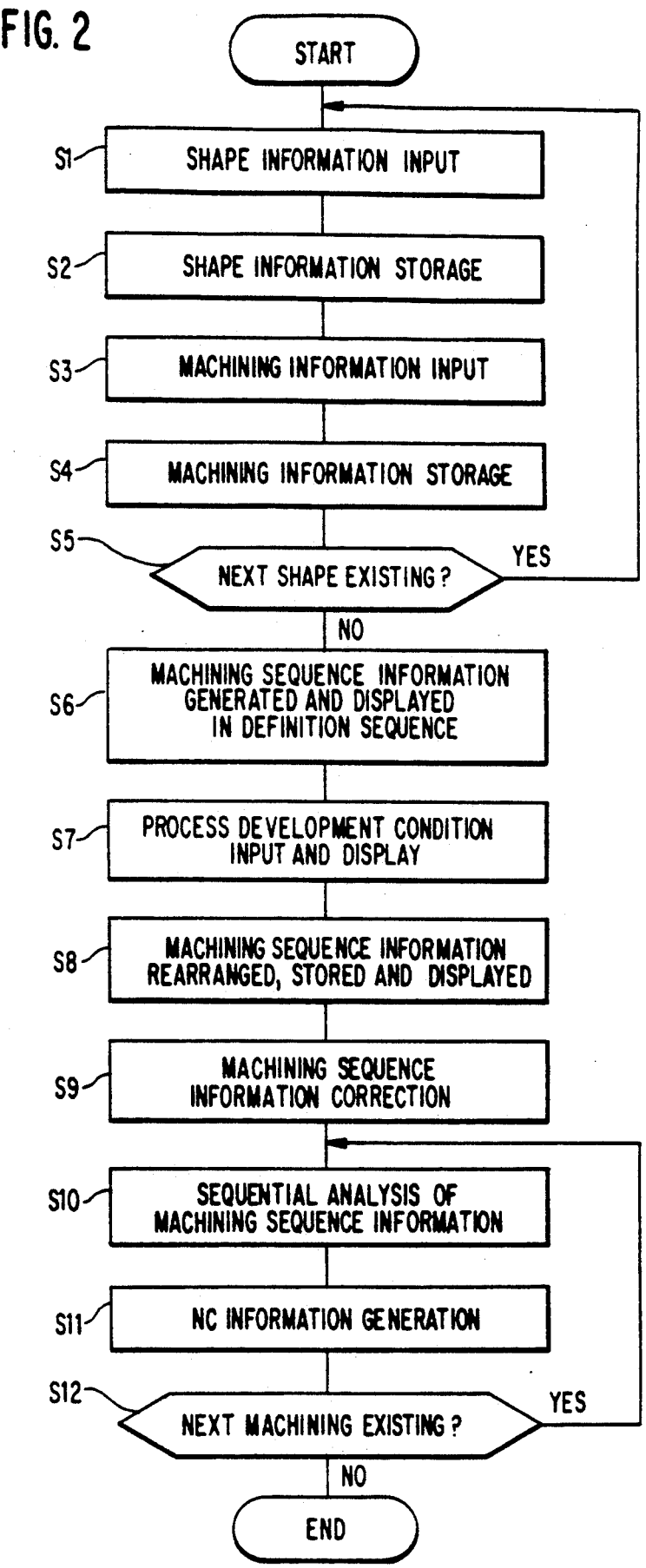
FIG. 2 is a flowchart illustrating a data generating process of the CAD/CAM unit according to an embodiment of the present invention.

Operation will now be described in accordance with a flowchart in FIG. 2. As shown in steps S1 to S5, for each shape in a workpiece, the corresponding shape information and machining information, defined and generated using a conventional procedure, are input and their results are respectively stored in the shape information memory 7 and machining sequence memory 8. The input and storage process is conducted for all shapes relevant to the workpiece.

4

Figure 3:
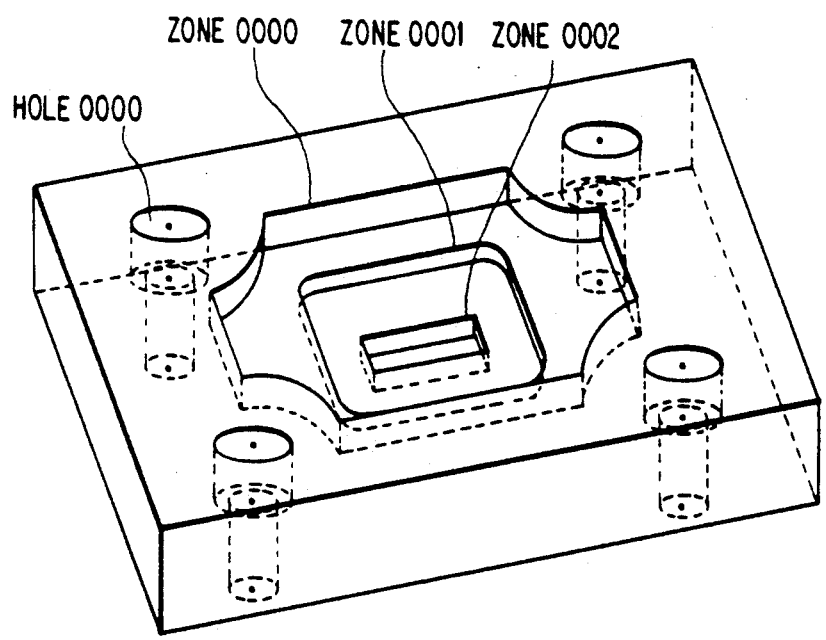
FIG. 3 shows a path of shape machining according to an embodiment of the present invention.
Figure 4:
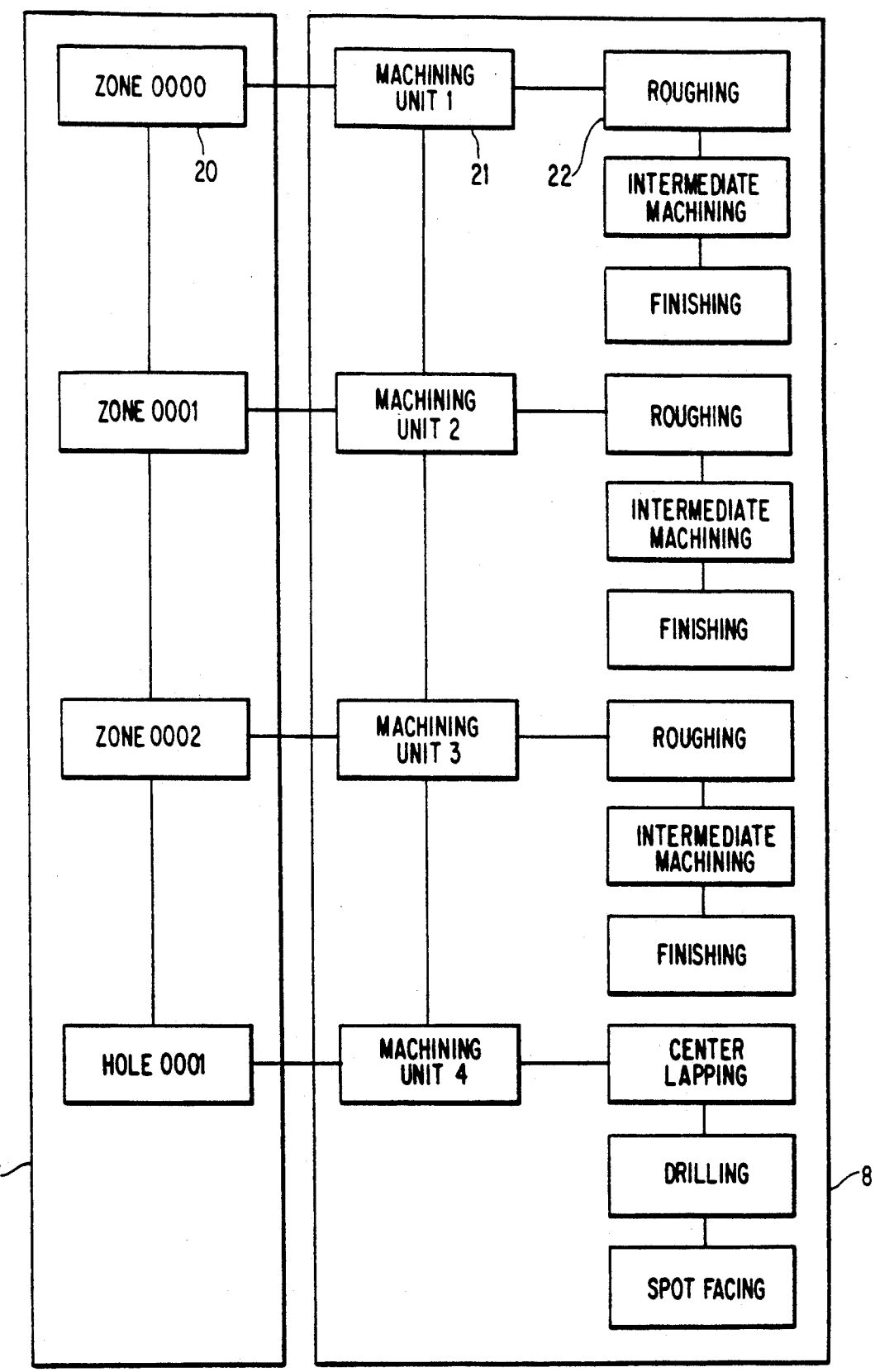
FIG. 4 illustrates information stored in a shape information memory and a machining information memory according to an embodiment of the present invention.

This operation may be described in reference to FIG. 3, showing a workpiece to be machined, wherein a three-step pocket is to be dug and four holes are to be provided around the pocket. When this workpiece geometry is being defined in accordance with the procedure, the shape information is generated and stored in the shape information memory 7 as shape units 20, in a configuration and sequence as shown in FIG. 4. Each shape unit is defined by data comprising the geometric form of a shape, coordinates where it exists, etc. In FIG. 4, four shape units, ZONE0000, ZONE0001, ZONE0002 and HOLE0000 have been generated for the workpiece. The four holes are represented by one unit.

The machining information memory 8 also stores information in a configuration as shown in FIG. 4. Included are machining units 21, assembled in a list structure and comprising information representing a defined machining sequence for a shape, and process units 22, comprising information such as whether the machining process is for roughing or finishing, the names of tools used, tool numbers, machining path generating methods, etc. The combination of a machining unit 21 and process unit 22 represents the steps required for finishing one shape using a plurality of machining processes.

As shown in FIG. 4, among the shape information and machining information stored in the shape information memory 7 and machining information memory 8 are certain predetermined categories of information important to the machining sequence, i.e., process units 22. This information is assembled in memory 8 in the predefined sequence established when the shape information was entered into memory 7. Certain information such as a machining type (shift, contour, drill, etc.), a zone or a hole, roughing or finishing, tool numbers and names, etc., are extracted in order from the process units 22 by information extraction section 9b. Further, extraction section 9b also extracts in order shape coordinates from the shape units 20. As a result, the machining sequence information is assembled according to such data, and the results are stored in the machining sequence information memory 10a. The generated and stored results are accessed by information display processing section 10c and are displayed on the CRT 15 screen as shown in FIG. 5. In this case, the process units 22 are assembled along the vertical axis direction in a sequence which is the predefined order of machining. This display is of parameters before development, as later explained.

As is shown in step S6, certain predetermined information, i.e., process unit 22, are assembled in a sequence defined on the basis of shape and machining information stored in shape information memory 7 and machining information memory 8. This definition sequence information is based solely on the input shape and machining information as seen in the conventional process. At the same time, machining type, i.e., zone or hole, roughing or finishing, tool number to be used or tool name, is extracted from process units 22 and shape coordinates are extracted from shape units 20. Machining sequence information is created on the basis of the process unit 22 information and the results are stored in machining sequence information memory 10a.

Conditions for deciding the actual machining sequence, namely process developing conditions, are then entered by the operator from the input device 1 as shown in step S7. The process developing conditions are generated based on the machining sequence information generated as described above and displayed to the operator. FIG. 6 shows an interactive screen displayed on the CRT 15 screen for entering the process developing conditions. When the machining sequence is to be set, for example, in an order so that hole machining is followed by zone machining, "Hole priority" is specified. Also, where machining is to progress from roughing to finishing, the selection is turned "ON". Where machining in the Z height direction is to be carried out in the order of higher values, the selection is turned "ON". Further, where all portions using the same tool are to be machined at one time in order to minimize tool changing operations, the selection is turned "ON". Alternatively, the tool developing condition of zone/hole development may be set to zone priority, and the tool developing conditions of only finishing development may be set. Finally, the Z height development and tool rising sequence development may be turned OFF, if desired. When hole machining has been specified in memory 7, as seen in FIG. 4, if the process development conditions for roughing/finishing development are set to ON, as seen in FIG. 6, the information for center lapping, drilling and spot facing are automatically set as process units 22. The conditions set by the operator as described above are stored into the condition storage 9a.

The machining sequence information that has been stored in machining sequence information memory 10a is then accessed and rearranged by the process developing section 10b in accordance with the process developing conditions stored in the condition storage 9a, as shown in step S8. This operation will now be described in detail in reference to a flowchart shown in FIG. 7. A comparison of the content of FIGS. 5 and 8 would be useful in order to follow the flow chart as it proceeds with the "development" of a desired machining sequence.

First, whether zone/hole development is required or not is determined in step S20. Since the corresponding process development condition has already been set to hole priority as shown in FIG. 6, that development is determined to be required and the operation moves to step S21.

The zone/hole development is then made as shown in step S21. Since the process development condition has been set to hole priority as shown in FIG. 6, hole machining has priority. Accordingly, as seen in a comparison of FIGS. 5 and 8, the shape unit HOLE0000 is re-arranged as the first machining sequence information, zone machining is then re-arranged as machining sequence information in order of the shape units ZONE0000, ZONE0001, ZONE0002, and the information is stored in the machining sequence information memory 10. The developed machining sequence now is as shown in FIG. 8.

Whether roughing/finishing development is required or not is then determined in step S22. Since the corresponding process developing condition has been set to ON as shown in FIG. 6, that development is determined to be required and the operation moves on to step S23.

The roughing/finishing development is then performed as shown in step S23. Roughing is defined as having the highest priority. Accordingly, the machining sequence information on hole machining is arranged in order of center lapping, drilling and spot facing. Also, the machining sequence information on zone machining is rearranged in order of roughing, intermediate machining, finishing. This information is stored in the machining sequence information memory 10 in correspondence with the hole/zone priority and in a sequence as shown in FIG. 8.

Whether z height development is required or not is then determined in step S24. Since the corresponding process development condition has been set to ON as shown in FIG. 6, that development is determined to be required and the operation progresses to step S25.

The z height development is then executed as shown in step S25. Since the higher value of the z height is defined as having a higher priority, 0 (unit: mm) is first provided for the center lapping, drilling and spot facing of hole machining as the machining sequence information, the machining sequence information on roughing, intermediate machining and finishing of zone machining is rearranged in order of 0, −10 and −15 (unit: mm), and the information is stored into the machining sequence memory 10 in a sequence as shown in FIG. 8.

Whether tool rising sequence development is required or not is then determined in step S26. Since the corresponding process development condition has been set to ON as shown in FIG. 6, that development is determined to be required and the operation proceeds to step S27.

The tool rising sequence development is then executed as shown in step S27. Since the use of common tools for roughing, intermediate machining and finishing has priority, the machining sequence information is first rearranged in order of tool number (hereinafter referred to as the "T number") 7 for center lapping and drilling of hole machining, T number 9 for spot facing, T number 11 for roughing of zone machining, T number 10 for intermediate machining, and T number 9 for finishing. The information is then stored into the machining sequence information memory 10a in a sequence as shown in FIG. 8, and this state is displayed on the CRT 15 screen so that the operator can check the results.

If the development operation is not necessary in any one of steps S20, S22, S24 and S26, the execution may be transferred to the next corresponding development operation or the series of operations may be terminated.

If necessary, the machining sequence information may then be corrected by the operator as shown in step S9. Since the machining sequence information is rearranged in accordance with the process developing conditions as described above, the machining sequence information can be corrected easily by changing the necessary process developing conditions while simultaneously checking the information displayed on the CRT 15 screen, as shown in FIGS. 6 and 8.

The machining sequence information stored in the machining sequence information memory 10a is then read to the process analyzer 11 and the information therein is analyzed sequentially as shown in step S10. The machining sequence information also is accessed directly by the information display processing section so that the content of the stored information can be displayed, as in FIGS. 5, 6 and 8.

As in the conventional device, the machining path is then determined by the NC information generator 12 in accordance with the analysis results of the process analyzer 11, as shown in steps S11 and S12. Then, the results are written to the NC data file 13, and processing for displaying the decided machining path on the CRT 15 screen is performed by the machining display 14.

Throughout the above described processes, the operator can decide the machining sequence in the stage of shape definition without any particular consideration thereof and avoid inefficiency, e.g., unnecessary repetition of tool changes. Moreover, when there are a plurality shapes to be defined for a workpiece, the advantages of the present invention will increase. In addition, if the machining sequence has been changed by the operator in step S9 and a wrong process developing condition has been given by correcting the displayed machining sequence information in step S8, the error is easily corrected. The original shape definition information is kept stored in the machining information memory 8 and, once the error is recognized, the proper machining sequence information can be provided easily be executing steps from S6 onward.

Clearly, the process developing conditions shown in FIG. 6 in this preferred embodiment may be changed to other conditions in order to produce the same effect as that embodiment.

It will be apparent that the invention, as described above, achieves a CAD/CAM unit data generating process which allows data to be generated efficiently, and independently of the sequence of shape definition. This result is possible because predetermined information is extracted from shape information generated in correspondence with shapes defined on a machining unit basis and machining information generated in correspondence with machining conditions defined on a shape information basis, the extracted information is generated as machining sequence information in said defined sequence, the machining sequence information is rearranged in accordance with the conditions of rearranging the machining sequence information, and the results are stored.

The entire disclosure of each and every foreign patent application from which the benefit of foreign priority has been claimed in the present application is incorporated herein by reference, as if fully set forth.

Although this invention has been described in at least one preferred form with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A CAD/CAM unit data generating process comprising the steps of:
   extracting predetermined information from shape information and machining information;
   generating said extracted information as machining sequence information in a defined sequence;
   setting conditions for rearranging said machining sequence information;
   rearranging said machining sequence information in accordance with said set conditions; and
   storing said rearranged machining sequence information.

2. The method of claim 1, wherein said shape information is generated in correspondence with shapes defined on a machining unit basis and said machining information is generated in correspondence with machining conditions defined on a shape information basis.

3. The method of claim 1, wherein said rearranging step comprises a consideration of process developing conditions comprising at least one of zone priority, rough/finish priority, Z-height priority, tool rising priority and common tool priority.

4. The method of claim 1, further comprising the steps of:
   inputting shape information and machining information; and
   storing shape information and machining information in at least one memory;
   wherein said input and storage steps are conducted for all shapes relevant to a workpiece.

5. The method of claim 1, wherein said shape information is stored as shape units defined by at least one of the geometric form of a shape and coordinates where it exists.

6. The method of claim 5, wherein said machining information is stored as machining units defined by at least a defined machining sequence for a shape assembled in a list structure.

7. The method of claim 6, wherein said shape units and corresponding machining units also have corresponding thereto process units comprising at least one of machining type, tool identification, finish type and shape type.

8. The method of claim 1, wherein said extracted information comprises at least machining type and shape coordinate information.

9. A CAD/CAM unit for automatically generating machining data comprising:
   first means for storing shape and machining information;
   means for extracting from said storing means predetermined information from said stored shape information and machining information and organizing the extracted information as machining sequence information in a predefined sequence;
   means for setting conditions for rearranging said machining sequence information;
   means for rearranging said machining sequence information in accordance with said set conditions; and
   second means for storing said rearranged machining sequence information.

10. The apparatus of claim 9, further comprising means for generating shape information in correspondence with shapes defined on a machining unit basis and machining information generated in correspondence with machining conditions defined on a shape information basis.

11. The apparatus of claim 9, wherein said second means for storing is operative to store shape units and corresponding machining units and process units.

12. The apparatus of claim 11, further comprising means for displaying said machining sequence information.

13. The apparatus of claim 12, further comprising means for generating machining control information on the basis of said machining sequence information.

* * * * *